US007581014B2

(12) United States Patent
Mittig et al.

(10) Patent No.: US 7,581,014 B2
(45) Date of Patent: Aug. 25, 2009

(54) METHOD OF MASKING APPLICATION PROCESSING APPLIED TO A REQUEST FOR ACCESS TO A SERVER, AND A CORRESPONDING MASKING SYSTEM

(75) Inventors: Karel Mittig, Caen (FR); Cedric Goutard, Douvres la Delivrande (FR); Pierre Agostini, Feuguerolles (FR)

(73) Assignee: France Telecom, Paris (FR)

( * ) Notice: Subject to any disclaimer, the term of this patent is extended or adjusted under 35 U.S.C. 154(b) by 1209 days.

(21) Appl. No.: 10/913,333

(22) Filed: Aug. 9, 2004

(65) Prior Publication Data

US 2005/0038898 A1    Feb. 17, 2005

(30) Foreign Application Priority Data

Aug. 12, 2003   (FR) .................................. 03 09872

(51) Int. Cl.
G06F 15/16    (2006.01)

(52) U.S. Cl. .................. 709/230; 709/200; 709/203; 709/202; 709/212; 709/220; 709/227; 709/234; 709/235; 709/236

(58) Field of Classification Search .......... 709/230
See application file for complete search history.

(56) References Cited

U.S. PATENT DOCUMENTS

| | | | | |
|---|---|---|---|---|
| 2002/0194292 | A1* | 12/2002 | King | 709/213 |
| 2003/0033283 | A1* | 2/2003 | Evans et al. | 707/1 |
| 2003/0033541 | A1* | 2/2003 | Edmark et al. | 713/201 |
| 2004/0006615 | A1* | 1/2004 | Jackson | 709/223 |
| 2004/0054779 | A1* | 3/2004 | Takeshima et al. | 709/225 |
| 2004/0260821 | A1* | 12/2004 | Yamamoto et al. | 709/229 |

OTHER PUBLICATIONS

Alen Wood, Predicting Client/server availability, 1995, Tandem Computers, pp. 41-48.*
Jack Y. B. Lee, Supporting Server Level Tolerance in Concurrent Push Based Parallel Video Servers, 2001, Vol. 11, pp. 25-39.*
Thomas Kunz, Fast Detection of Communication Patterns in Distributed Executions, 1997, IBM Press.*
Vijay K. Naik, Adaptive Resource Sharing in a Web Services Environment, 2004, vol. 8.*
"Configuring Covalent Headers" Covalent Enterprise Ready Server Product Guide, Jul. 1, 2002, XP002273946 <URL:http://www.covalent.net/support/docs/ers/2.2.0/HTML/ProductGuide/proxymodule.html>.

* cited by examiner

*Primary Examiner*—Firmin Backer
*Assistant Examiner*—Arvin Eskandarnia
(74) *Attorney, Agent, or Firm*—Young & Thompson (57) ABSTRACT

A method of and module for masking application processing applied to a request for access to a server by a client workstation connected via successive proxy servers. The application of a first proxy server, is executed, the address of the client workstation is inserted into a specific data field of the access request message header, without calling for any IP spoofing function and the access request message for execution of successive application processing is sent to successive proxy servers. After execution of its application processing by a last proxy server and transmitting of the access request message to the server, the access request message is intercepted at a masking module, the specific field from the header is eliminated to mask the application processing, and a masked access request message is constructed and the masked access request message is sent from the masking module to the server.

8 Claims, 6 Drawing Sheets

METHOD OF MASKING APPLICATION PROCESSING APPLIED TO A REQUEST FOR ACCESS TO A SERVER, AND A CORRESPONDING MASKING SYSTEM

The invention relates to a method of masking application processing applied to a request for access to a server, and it also relates to a corresponding masking system.

On connecting a workstation to a server on an IP network, the server identifies the workstation from an IP address called the client address. This client address is generally used to personalize the content of the information offered to the client in response to the request, to implement access control mechanisms by verifying access rights, and to provide metering and/or billing mechanisms.

At present, to offer added value on access to their networks, more and more network operators and service providers are turning to providing network core services such as virus protection, parental control, etc.

The implementation of these services by means of dedicated application processes gives rise to the problem of how they impact on the existing architecture.

This being so, the implementation of services between a client workstation and a server is not neutral, in that it permanently eliminates the connection between the client workstation and the server. This masks the server and the client from each other and results in degraded access conditions for the client, the deterioration sometimes being visible.

Figure 1A:
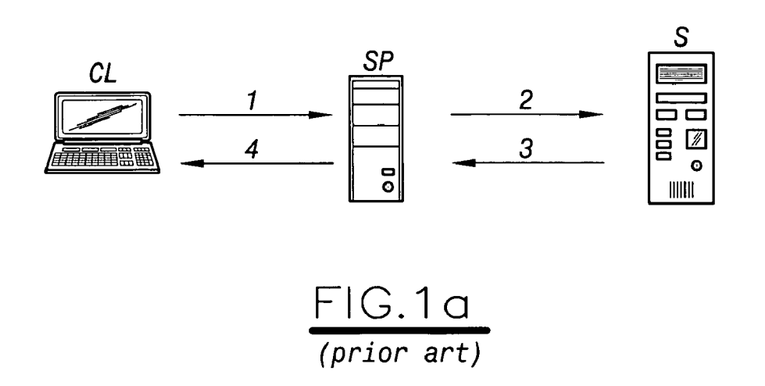

The above services use dedicated mechanisms whose function is to implement them in a manner that is transparent for the client workstation and/or the server. These mechanisms mask the presence of the service, and the application processing applied by the service, between a client workstation and a server, and may be summarized as follows:

1) Standard Non-transparent Service, Proxy Mode (FIG. 1a)

This standard implementation of the service entails configuring the client workstation explicitly so that any server access request message passes through an intermediate proxy server executing the service.

The source and destination IP addresses of the transactions of steps 1 to 4 are set out in table 1 below:

TABLE 1

| Step | Source IP address | Dest. IP address |
|------|-------------------|------------------|
| 1    | Client            | Proxy            |
| 2    | Proxy             | Server           |
| 3    | Server            | Proxy            |
| 4    | Proxy             | Client           |

In this case the service is not transparent either for the client workstation or for the server, because the client workstation sends requests only to the proxy server and the server receives requests only from the proxy server. Thus the server never knows the source IP address of the client workstation.

2) Service Transparent for the Client Workstation

This implementation solves only part of the problem of transparent execution of the service, namely transparent execution of the service from the point of view of the client workstation.

The source and destination IP addresses of the transactions of steps 1 to 4 are set out in table 2 below:

TABLE 2

| Step | Source IP address | Dest. IP address |
|------|-------------------|------------------|
| 1    | Client            | Server           |
| 2    | Proxy             | Server           |
| 3    | Server            | Proxy            |
| 4    | Server            | Client           |

In this case, requests from the client workstation are redirected transparently to the proxy server, which executes its application processing and then forwards the processed request to the server.

Having the advantage of not necessitating explicit configuration of the client workstation, this approach is the preferred option in any consumer deployment, where it is difficult to control the use of terminals.

However, the server does not know the source IP address of the client workstation, whose requests and transactions reach it via the same service provider proxy server.

3) Service Transparent for the Client Workstation and for the Server

The current technique for rendering a service transparent for the server is based on using a proxy server that is transparent from the point of view of the client workstation and is able to re-use the client IP source address when it interrogates the server (transaction 2 in FIG. 1a).

This kind of solution is known as "transparent proxy with spoofing", the term "spoofing" denoting the technique of one entity passing itself off as another entity on the network by using its address.

The source and destination IP addresses of the transactions in steps 1 to 4 are set out in table 3 below:

TABLE 3

| Step | Source IP address | Dest. IP address |
|------|-------------------|------------------|
| 1    | Client            | Server           |
| 2    | Client            | Server           |
| 3    | Server            | Client           |
| 4    | Server            | Client           |

This solution is characterized by:
no configuration of the client workstation, requests being redirected transparently to the proxy server, and
re-use of the source IP address of the client workstation (IP spoofing), the proxy server forwarding the processed request to the server using the source IP address of the client workstation, not its own address.

Although the above solution has no effect on existing network architecture, and for this reason constitutes, in theory, an ideal way to introduce network core services, it nevertheless has numerous drawbacks and limitations that at present are greatly restricting its use.

In the case of a single service:
proxy servers employing the IP spoofing function (re-using the source IP address of the client workstation) are rare; consequently, an architecture employing totally transparent proxy servers will necessarily be limited in terms of the choice of services and suppliers/manufacturers managing them, and
using the IP spoofing function reduces the performance of the proxy servers; to achieve sufficient performance, services must therefore be specified to take account of this function.

In the case of a plurality of chained or successive services, or services that use load sharing:

all services implemented in the access architecture must implement the IP spoofing function successively, at each of the successive proxy servers, which would seem to be very damaging, at least in terms of overall transmission time, and this solution leads to major difficulties when load sharing mechanisms are employed to route IP data packets differently in order to share the traffic load.

This is because, if this solution is used, it is imperative for a given connection to have the IP data packets transit through the same equipment (proxy servers) on the outward path (client to server) and on the return path (server to client).

Figure 1B:
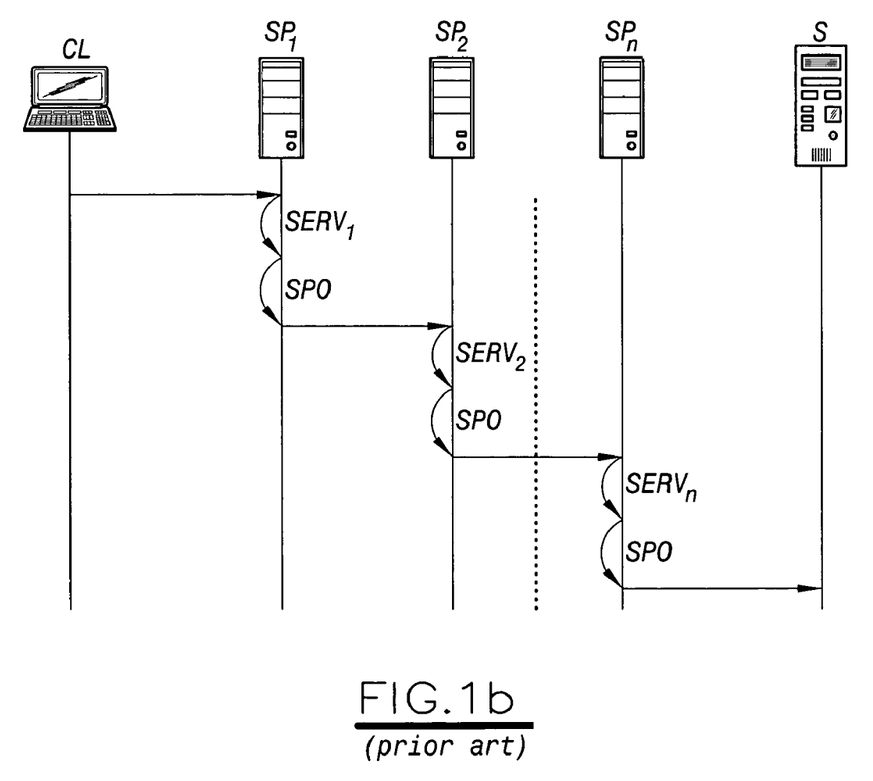

This is because, if a plurality of service provider proxy servers use the IP spoofing function, it is not possible to restore the order of the IP packets dynamically, each service being executed in a totally transparent manner. FIG. 1b, in which SPO denotes the IP spoofing function, is a diagram of the current solution.

An architecture using a plurality of chained service provider proxy servers or load sharing mechanisms must therefore be based on static sequencing of the services based on the source IP protagonist of the client workstation and of the server (using hash-coding algorithms) to guarantee that IP data packets for the same client workstation coming from the client workstation and from the server pass in transit through the same service provider proxy servers on the outward path and the return path.

An object of the invention is to remedy the drawbacks and limitations of the current technique using the IP spoofing function.

To this end, the method of the invention for masking application processing of a request for access to a server sent by a client workstation applies when the client workstation is connected to the server through the intermediary of successive intermediate proxy servers of an IP network. The method is noteworthy in that it consists in, at the first proxy server that the access request message reaches, executing the application processing applied to the access request message by the first intermediate proxy server, and inserting the IP address of the client workstation into a specific data field of the header of the access request message, and, at the successive proxy servers, without invoking an IP spoofing function, successively forwarding the access request message to the next proxy server, retaining the IP address of the client workstation in the header of the access request message, for execution of the application processing applied by each of the successive intermediate proxy servers, and, after execution of each of the successive application processes and forwarding of the access request message to the server by the last of the successive intermediate proxy servers, at a masking module having an interception connection to the server, intercepting the access request message, eliminating the specific field from the header of the access request message to mask the application processes applied by the successive intermediate proxy servers, constructing a masked access request message comprising as its source IP address the address of the client workstation and as its destination IP address the IP address of the server, and sending the masked access request message from the masking module to the server.

This enables the server to process the masked access request message as if it came directly from the client workstation.

The method of the present invention for sending a transparent response message from a server to a client workstation when the server has received a masked access request message is noteworthy in that it consists in, after a specific response message is sent to the destination address, i.e. to the IP address of the client workstation, and at a masking module, intercepting the specific response message, extracting from the specific response message the destination address, i.e. the IP address of the client workstation, then, on the basis of the destination address, discriminating the intermediate source IP address corresponding to the IP address of the last intermediate proxy server that the access request message has reached, then, on the basis of the specific response message, constructing a reconstructed response message comprising as its destination address the intermediate source IP address corresponding to the IP address of the last intermediate proxy server that the access request message has reached, sending the reconstructed response message from the masking module to the last intermediate proxy server, and, at the last intermediate proxy server and the successive intermediate proxy servers, executing the corresponding application processing, successively sending the reconstructed response message to the preceding proxy server and, after successive execution of each of the application processes by each of the intermediate proxy servers, at the first intermediate proxy server that the access request message reaches, constructing a transparent response message by replacing the intermediate source IP address in the reconstructed response message corresponding to that of the first proxy server that the access request message reaches with the source IP address corresponding to that of the server, and sending the transparent response message from the first proxy server to the client workstation.

This enables the client workstation to process the transparent response message as if it came directly from the server.

The method and the system of the present invention of masking application processing of a server access request message may be applied to managing transparent application processing for client terminals and/or servers on an IP network.

They will be better understood on reading the following description and examining the drawings, in which, in addition to FIGS. 1a and 1b relating to the prior art:

FIG. 2b is a flowchart of one of the successive steps of the non-limiting example of the method of the invention shown in FIG. 2a;

The method of the present invention for masking application processing of a server access request message sent by a client workstation is described in more detail below with reference to FIGS. 2a to 2e.

Figure 2A:
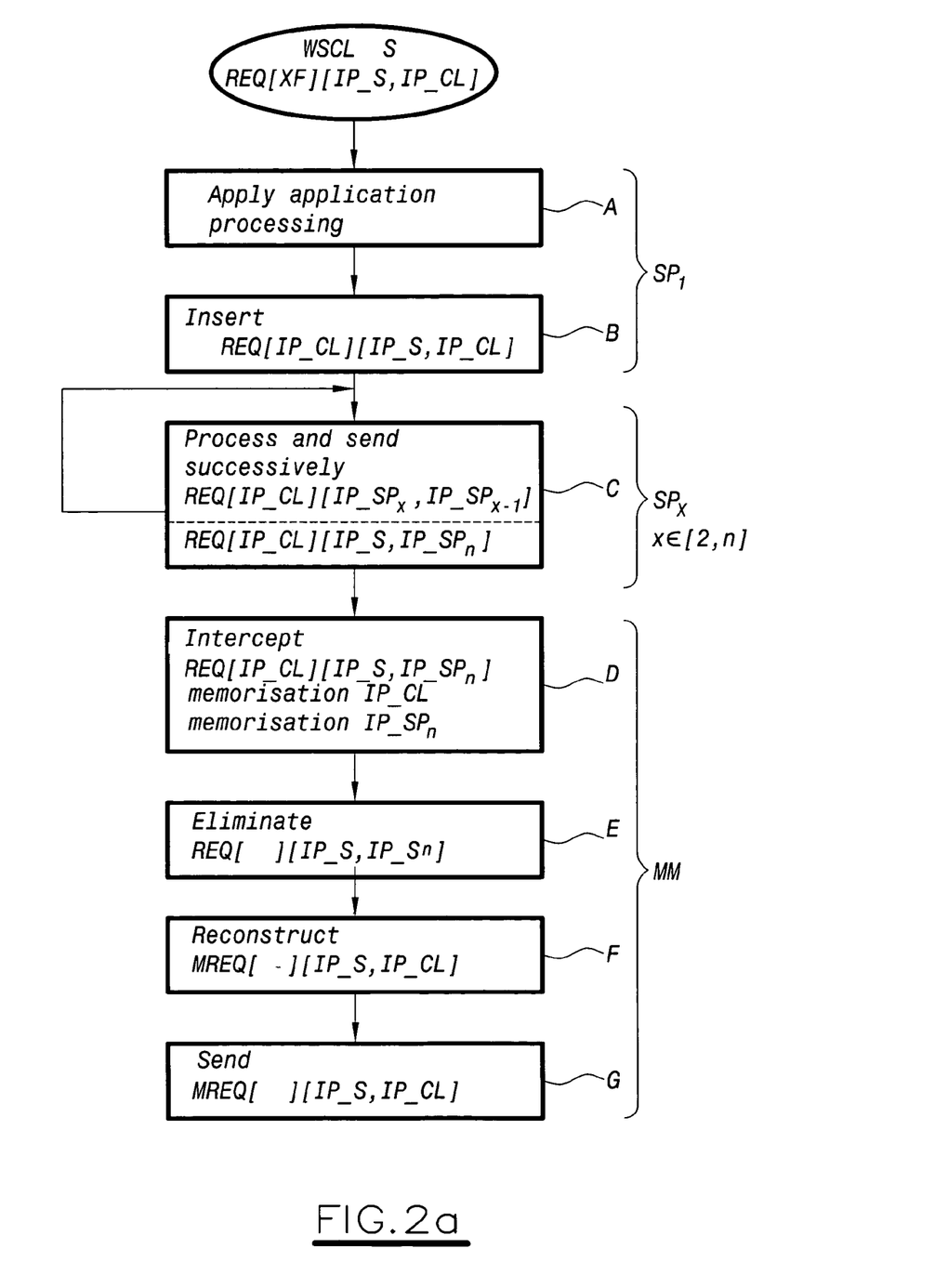
FIG. 2a is a flowchart of the successive steps of a non-limiting example of the method of the present invention for masking application processing for routing a server access request message transparently from the point of view of the server.

FIG. 2a shows the client workstation WSCL and the successive proxy servers $SP_x$ through which a request for access to the server S passes, where x designates the rank of the successive proxy servers and takes a value in the range from 1 to n, for example.

As general rule, the access request message takes the form:

REQ [XF] [IP_S, IP_CL]

The data fields of the above access request message contain:

XF: the IP spoofing address; this field is normally empty if the access request message is sent by the client terminal WSCAL, IP_S: the IP address of the access request message, i.e. the address of the server S, and IP_CL: the source IP address, i.e. the address of the client terminal sending the request.

In the method of the invention, and as shown in FIG. 2a, when the access request message reaches the first proxy server $SP_1$, which must be transparent from the point of view of the client, the first proxy server $SP_1$ applies its application processing to the above access request message in a step A.

In a step B, the IP address of the client workstation is inserted into a specific data field of the header of the access request message.

Referring to FIG. 2a, following step B, the access request message takes the form:

REQ [IP_CL] [IP_SP, IP_CL]

Using the above notation, the access request message is considered after executing the application processing concerned in step A and then inserting the IP address of the client workstation into the specific data field of the header of the access request message, consisting by way of preferred but non-limiting example of an X-Forwarded-For data field of access request messages sent by client terminals in TCP/IP client/server transactions.

Generally speaking, steps A and B in FIG. 2a executed by the first intermediate proxy server $SP_1$ may be interchanged.

Execution of the method of the invention then continues in the successive proxy servers $SP_x$, where x is in the range [2, n]. The proxy servers $SP_x$ (x≠1) may or may not be transparent from the point of view of the client.

A step C of the method consists in each of the successive intermediate proxy servers successively forwarding the access request message and, of course, successively executing its application processing; the message is forwarded without invoking the IP spoofing function and, of course, with the IP address of the client workstation retained in the header of the access request message.

In FIG. 2a successive forwarding of the access request message and execution of the application processing are reflected in modification of the access request message, which becomes:

REQ [IP_CL] [$IP\_SP_x$, $IP\_SP_{x-1}$]

Thus it is clear that successive forwarding from one intermediate proxy server to the next is effected by substitution of the destination IP addresses and the source IP address of the successive proxy servers in accordance with the method of routing data packets constituting the access request message, this substitution being symbolized in FIG. 2a by the return loop to step C for values of x in the range [2, n].

Of course, if steps A and B are interchanged, step A of executing the application processing of the first proxy server $SP_1$ may be integrated directly into step C, for example; this remains within the scope of the masking method of the present invention.

At the end of the FIG. 2a step C, i.e. when the access request message has reached the last proxy server $SP_n$, and after execution of the standard routing process and forwarding of the access request message by the successive intermediate proxy servers using the standard routing process without invoking the IP spoofing function, the access request message prepared for onward transmission from the last proxy server $SP_n$ to the server S is available, and takes the form:

REQ [IP_CL] [IP_S, $IP\_SP_n$]

In the above access request message, the destination IP address is none other than the address IP_S of the server and the source IP address is the address $IP\_SP_n$ of the last proxy server that executed the last application processing.

The last proxy server then sends the above access request message to the server S.

According to a remarkable aspect of the method of the present invention, a step D of intercepting the access request message is then executed in a masking module MM which has an intercept connection to the server S.

Step D may then be followed by a step E of eliminating the specific field from the header of the access request message, i.e. deleting the data constituting the address IP_CL of the client workstation from the access request message. This masks the application processing executed by the successive intermediate proxy servers. Of course, the IP address of the client workstation may be stored for subsequent use before the above address data is deleted (see below).

After step E, the access request message takes the form:

REQ [] [IP_S, $IP\_SP_n$]

Step E may then be followed by a step F of constructing a masked access request message having as its source IP address the address IP_CL of the client workstation and as its destination IP address the IP address IP_S of the server.

After step F, the modified access request message takes the form:

MREQ [] [IP_S, IP_CL].

Step F may then be followed by a step G of sending the masked access request message from the masking module MM to the server S.

This allows the server S to process the masked access request message as if it came directly from the client workstation, because the source IP address of the modified access request message is none other than the workstation's address IP_CL.

Figure 2B:
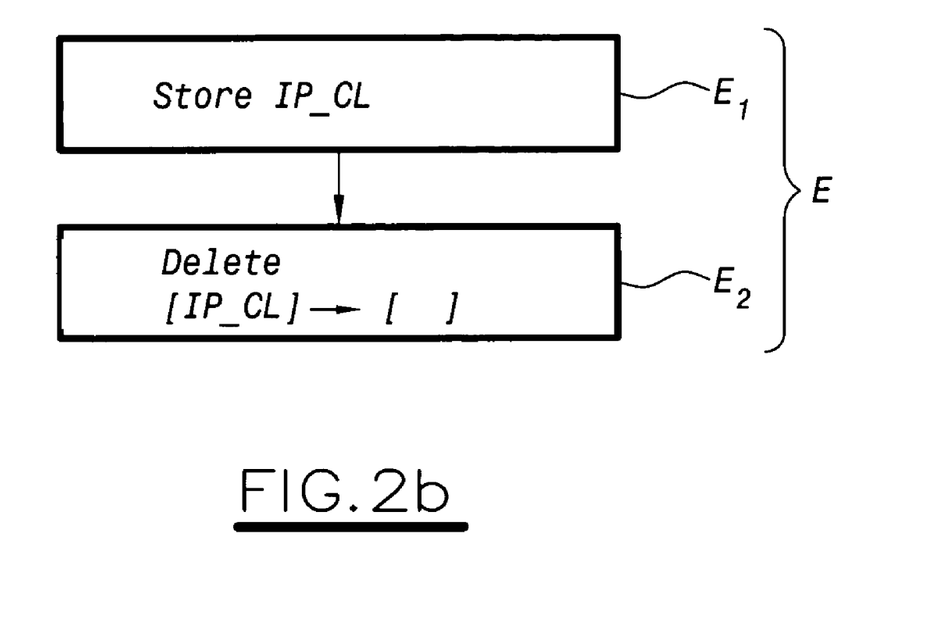

As a general rule, and as shown in FIG. 2b, executing step E represented in FIG. 2a of eliminating the specific field from the header of the access request message advantageously consists in storing the IP address of the client workstation taken from the specific field of the header of the access request message in a step $E_1$ and deleting the IP address data of the client workstation in the specific field of the header of the access request message, i.e. in the X-Forwarded-For field, in a step $E_2$. Of course, the method of the present invention is not limited to steps represented in FIGS. 2a and 2b. By way of non-limiting example, in a step D, following interception of the access request message, the method of the invention may store the address IP_CL of the client workstation contained in the X-Forwarded-For field, which is in fact step E1 represented in FIG. 2b, and store the source IP address contained in the intercepted access request message, i.e. the address IP_SP of the last proxy server that executed the last application processing applied to the access request message.

Storing the addresses IP_CL and IP_SP$_n$ enables a data structure such as a list, a table or the like to be constructed for establishing a one-to-one correspondence between the two addresses for subsequent use in the context of sending a response message from the server S to the client terminal, as described below.

As a general rule, the method of the present invention as described in relation to FIGS. 2a and 2b uses the masking technique to assure transparency, from the point of view of the server, of the application processing operations executed by the service equipment integrated into each of the successive intermediate proxy servers.

The separation of these functions:
- widens the service offer available in the case of a transparent service architecture;
- facilitates the specification process and the architecture, as the functions offered by the application services are separate from the equipments providing the transparency and it is therefore possible to specify each service or application process as a function of its intrinsic performance; and
- simplifies the engineering rules by masking the processes only after passage through all of the services, this mode of operation facilitating the implementation of load sharing mechanisms on the corresponding service platform.

The method of the present invention also enables the use of a process that assures transparency from the point of view of the client of masking application processing executed by successive intermediate proxy servers when a response message is sent by the server S to the client workstation WSCL.

Nevertheless, generally speaking, response messages sent by servers over the IP network to any client workstation that has sent a request to access the server do not comprise any specific intermediate header field, such as the X-Forwarded-For data field. This being so, and according to one remarkable aspect of the method of the invention, in the absence of an intermediate field, execution of the application processes or services in a manner that is transparent from the point of view of the client is assured by only the first proxy server SP$_1$ that is reached by the access request message sent by the client workstation WSCL, as described below with reference to FIG. 2c.

Figure 2C:
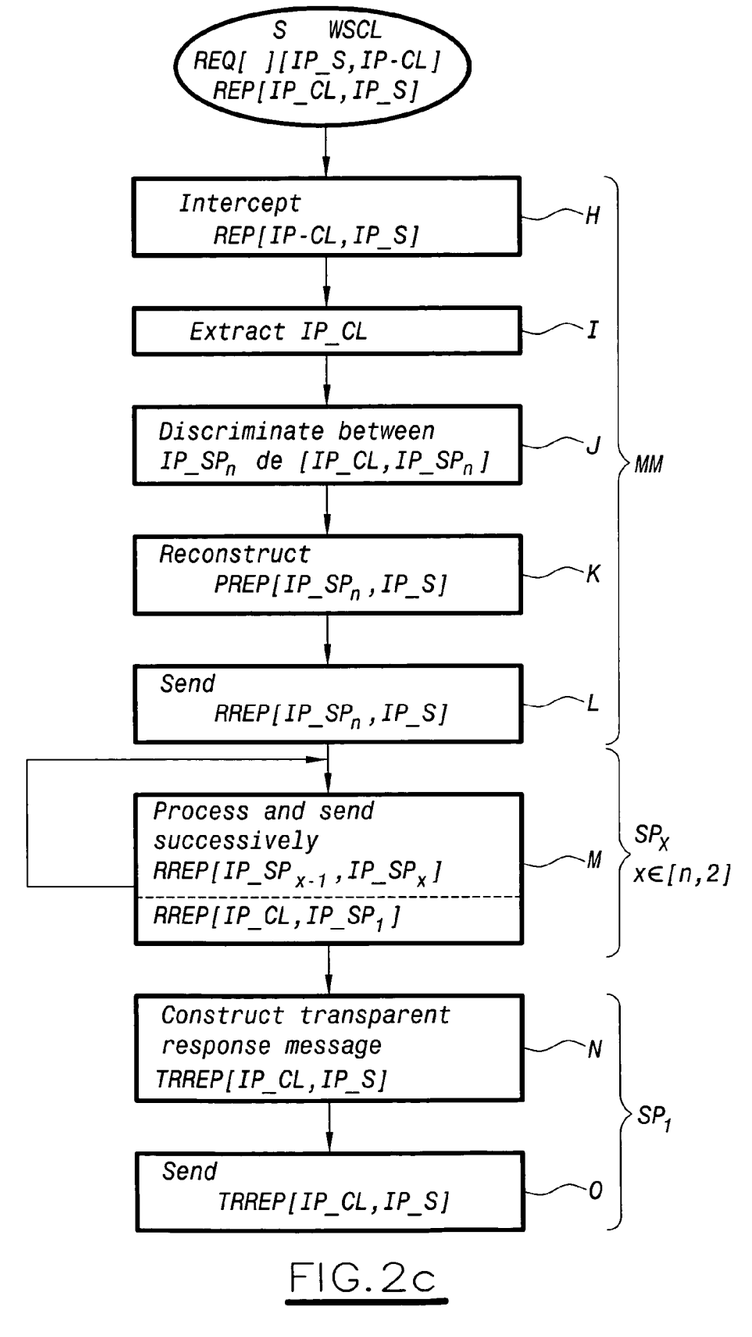
FIG. 2c is a flowchart of the successive steps of a non-limiting example of the method of the present invention of masking application processing enabling routing of a specific response sent by a server to the client terminal in a manner that is transparent from the point of view of the client terminal.

Referring to FIG. 2c, consider a server S which has received an access request message such as the modified access request message sent to the server in step G of FIG. 2a.

After receiving the modified access request message, the server S sends a specific response message of the form:

REP [IP_CL, IP_S]

The expression "specific response message" means, of course, that the response message is specific to the access conditions and to the information required by the access request message, such as the modified access request message referred to above, independently of the nature of the data transmitted and the rights of the user and the client workstation to access the databases of the server S concerned, and where applicable of the level of such rights.

Referring to FIG. 2, it is clear in particular that the response message essentially comprises a destination IP address in the form of the client IP address IP_CL of the client workstation WSCL and, of course, a source IP address that is none other than the address IP_S of the server S.

This being so, the method of the present invention for routing a masked response message intercepts the specific response message REP [IP_CL, IP_S] after it is sent to the destination address of the client workstation, at a masking module MM, in a step H.

Step H is then followed by a step I of extracting the destination IP address, i.e. the address IP_CL of the client workstation, from the intercepted specific response message.

Step I is itself followed by a step J of discriminating, on the basis of the destination IP address, the intermediate source IP address corresponding to the IP address of the last intermediate proxy server that the access request message reached, i.e. the last intermediate proxy server, whose address is IP_SP$_n$.

Clearly, for this purpose, it is advantageous to use the data structure obtained in step D shown in FIG. 2a by establishing a one-to-one correspondence between the destination IP addresses IP_CL and the address IP_SP$_n$ of the last proxy server reached by the access request message.

Step J is then followed by a step K of constructing a reconstructed response message on the basis of the specific response message, the reconstructed response message comprising as its destination address the intermediate source IP address corresponding to the IP address of the last intermediate proxy server that the access request message reached, i.e. the address IP_SP$_n$. The source IP address, i.e. the address IP_S, may be retained.

After step K, the reconstructed response message takes the form:

RREP [IP_SP$_n$, IP_S]

Step K may then be followed by a step L of sending the reconstructed response message from the masking module MM to the last intermediate proxy server, whose address id IP_FP$_n$. As shown in FIG. 2c, the method of the present invention for routing a response message then consists in, at the last intermediate proxy server and the successive intermediate proxy servers SP$_x$, where x is in the range [n, 2], executing the corresponding application processing in a step M and sending the reconstructed response message to the preceding proxy server.

All the operations executed in step M are represented by the reconstructed response message, which takes the form:

RREP [IP_SP$_{x-1}$, IP_SP$_x$], where x is in the range [n, 2], and by the return loop depicting the execution of each application process followed by sending in the direction opposite that for sending the access request message to the server at each preceding proxy server of rank decreasing from n to 2.

At the end of step M, see FIG. 2c, there is available at the first proxy server SP$_1$ that the message requesting access to the server S reaches a reconstructed response message in the form:

RREP [IP_CL, IP_SP$_1$] that may be forwarded to the client workstation WSCL with the destination IP address IP_CL.

According to one remarkable aspect of the method of the present invention, at the first intermediate proxy server SP$_1$ that the access request message reaches, step M is then followed by a step N of constructing a transparent response message obtained by substituting, in the reconstructed response message, the source IP address IP_S corresponding to that of the server S for the intermediate source IP address corresponding to that of the first proxy server that the message requesting access to the server S reaches.

Following execution of step N, the transparent response message takes the form:

TRREP [IP_CL, IP_S]

Step N may then be followed by a step O of transmitting the transparent response message from the first proxy server SP$_1$ to the client workstation WSCL at the destination IP address IP_CL.

The method of the present invention for routing a response message enables the client workstation WCSL to process the transparent response message as if it came directly from the server S.

Figure 2D:
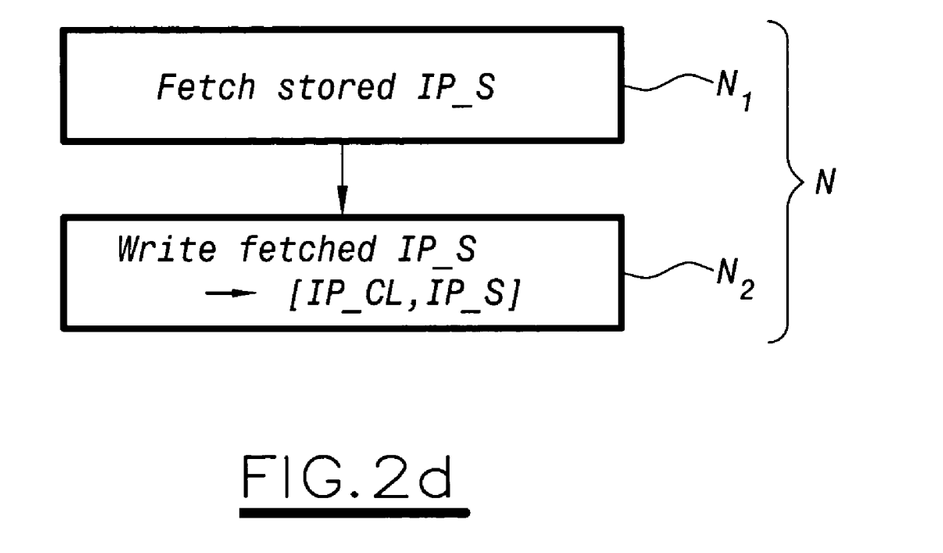
FIG. 2d is a flowchart of one of the successive steps of the example of the method of the invention shown in FIG. 2c.

A specific way executing step N of the method of the invention shown in FIG. 2c is described below with reference to FIG. 2d. Referring to FIG. 2d, step N of constructing a transparent response message may advantageously consist in a step $N_1$ of fetching the destination IP address of the access request message that was stored in the first proxy server $SP_1$ reached by the access request message at the time the access request message was transmitted.

Generally speaking, storing the destination IP address, i.e. the address IP_S of the server S, at the first proxy server $SP_1$ at the time of transmitting the access request message does not necessitate any storage operation specific to the method of the present invention for routing a masked access request message. This kind of storage operation is systematically and automatically effected at the proxy server $SP_1$ because transparent routing is used for the client of the proxy server $SP_1$, and the stored address IP_S may therefore be called up simply by using the storage address of that data.

Step $N_1$ may then be followed by a step $N_2$ of writing the called address IP_S in place of the intermediate source IP address, i.e. the address $IP\_SP_1$ of the reconstructed response message obtained at the end of step M shown in FIG. 2c, thereby constituting the source IP address corresponding to that of the server S.

Figure 2E:
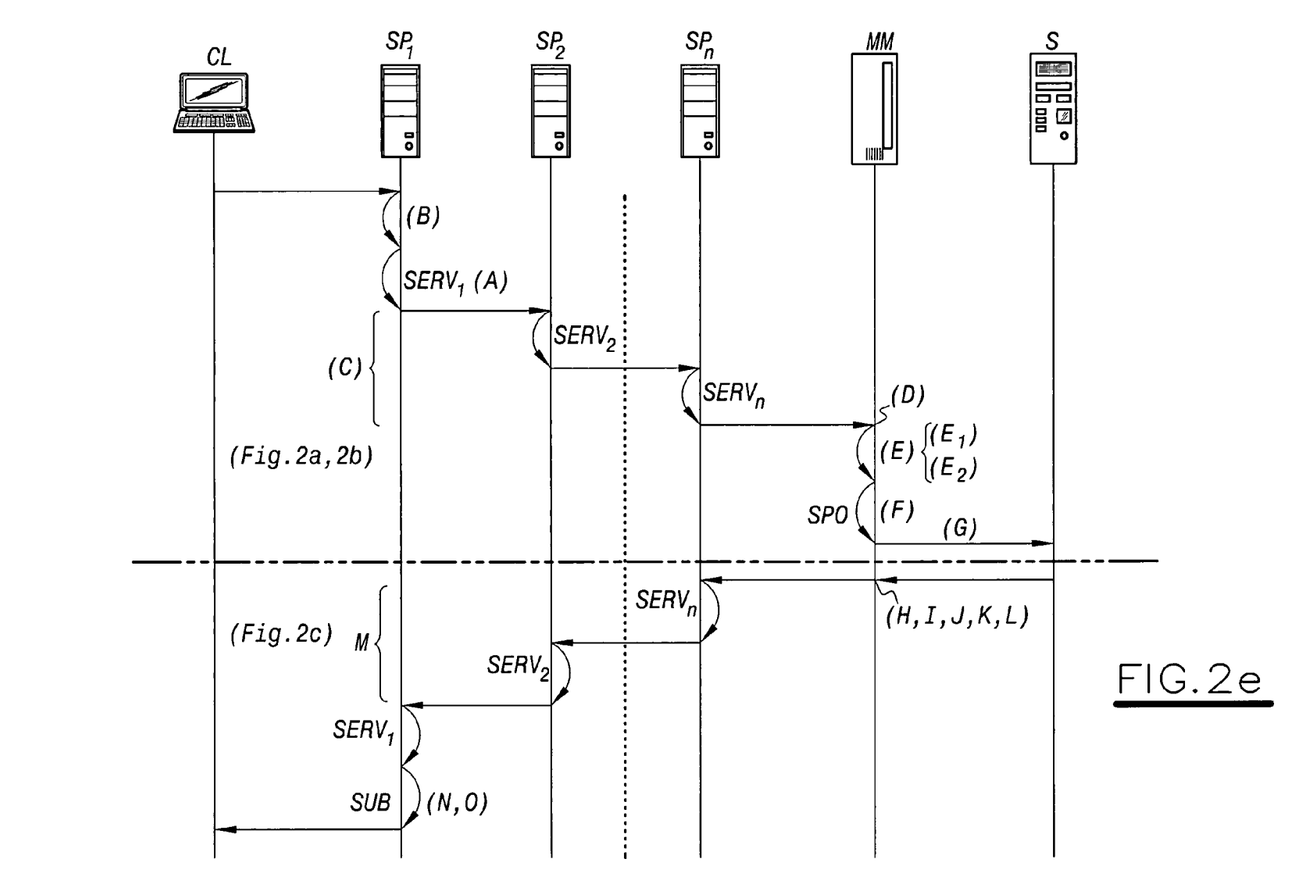
FIG. 2e is a space-time diagram showing the implementation of one example of the method of the invention of masking IP network application processing relating to an access request message, respectively a response to that access request message.

FIG. 2e is a space-time diagram illustrating the use of the method of the present invention for routing an access request message from a client workstation to a server S and for routing a response message from the server S to the client workstation.

The upper portion of FIG. 2e represents the routing of an access request message, the application processes $SERV_1$, $SERV_2$, and $SERV_n$ being applied to the access request message at the successive proxy servers $SP_1$, $SP_2$, and $SP_n$, respectively.

The steps of the method of the invention represented in FIG. 2a are identified in the upper portion of FIG. 2e.

The method of the present invention of routing the response is represented in the lower portion of FIG. 2e, the steps represented in FIG. 2c being identified in this portion of the figure.

Comparison with the FIG. 1b space-time diagram shows that the present invention substantially eliminates invoking the IP spoofing function for successive forwarding from one intermediate proxy server to the next.

However, the IP spoofing function is invoked by the masking module MM in step F, for onward transmission to the server S.

This clearly simplifies the engineering rules and the rules for executing the application processes without invoking the IP spoofing function, as indicated above. Furthermore, independent load sharing mechanisms may then be used for each of the intermediate proxy servers.

Finally, with regard to the method of routing the response message represented in FIG. 2e, although invoking the IP spoofing function cannot be envisaged, given the structure of the response messages generated by the servers, implementing the substitution (SUB), by replacing in the reconstructed response message the intermediate source IP address corresponding to the address $IP\_SP_1$ of the first proxy server $SP_1$ with the source IP address IP_S corresponding to that of the server produced by step N from FIG. 2c ensures that the application processes are transparent from the point of view of the client workstation WSCL to a degree that is substantially equivalent to that which would be achieved by invoking the IP spoofing function.

Finally, with reference to FIG. 2e, the first proxy server SPoperates transparently from the point of view of the client, whereas the successive servers $SP_2$ to $SP_n$ may or may not operate transparently from the point of view of the client, the absence of transparency from the point of the client corresponding to a proxy operating mode in which the source IP address used for forwarding from one proxy server to the next actually corresponds to the IP address of the proxy server concerned.

This mode of operation is illustrated in step C in FIG. 2a, and respectively in step M in FIG. 2c.

Finally, in respect of constructing the masked message in step F in FIG. 2a, respectively step N, for constructing the transparent response message represented in FIG. 2c, the reconstruction operations are applied to the successive IP data packets that transport the access request message, respectively the response message, in accordance with the TCP/UDP IP protocol, the invention being usable in the context of both these protocols.

A more detailed description is given below with reference to FIG. 3 of a module for masking application processing applied to an access request message sent by a client workstation connected to a server through successive intermediate proxy servers of an IP network, respectively a response message sent by the server to the client terminal.

Figure 3:
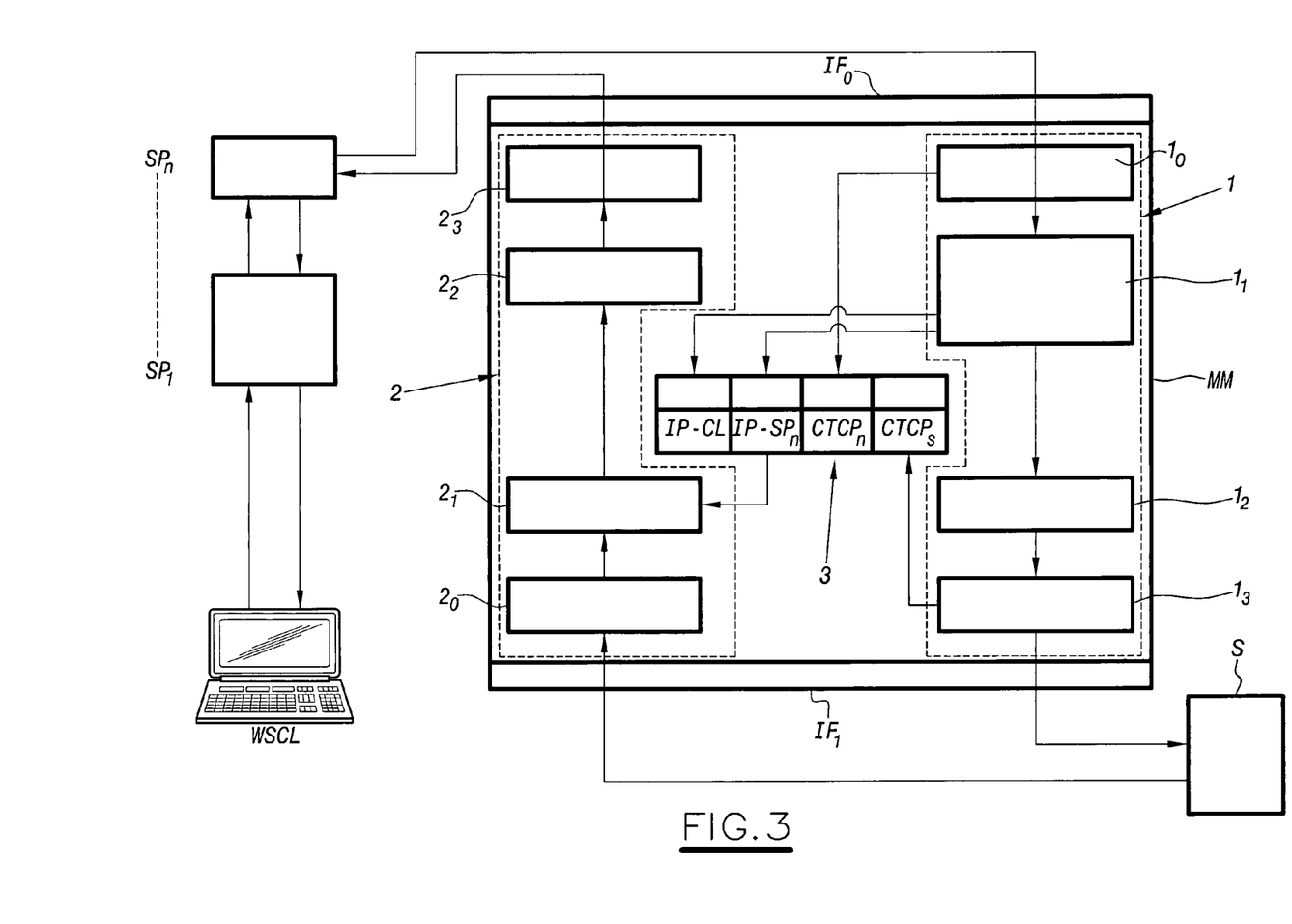
FIG. 3 is a functional diagram of one example of a masking module of the present invention adapted to intercept any access request message, or any specific response message, respectively addressed to or coming from, an IP network server.

As shown in FIG. 3, the masking module MM of the invention has a first interception channel for intercepting the access request message, this channel being the channel 1 in FIG. 3a. The first interception channel 1 generates, from the access request message, a masked access request message containing as its source IP address the address of the client workstation and as its destination address the IP address IP_S of the server, as described above in relation to steps D, E, F, G shown in FIG. 2a.

The masking module MM of the invention has a second interception channel for intercepting a specific response message sent by the server in response to the masked access request message. This second interception channel is the channel 2 in FIG. 3. It generates, from the specific response message, a reconstructed response message, as explained above in the description of the method of the present invention, and in particular in the description of steps H, I, J, K, L represented in FIG. 2c.

Furthermore, the masking module of the invention comprises a storage module 3 that may be written to and read from by the first and the second interception channels, respectively.

The storage module 3 is used, on interception of the access request message, at least to store the IP address of the client workstation, taken from a specific field of the header of the access request message, and the IP address $IP\_SP_n$ of the last intermediate proxy server $SP_n$, taken from the access request message.

It is also used, on interception of a specific response message, to extract the IP address of the last intermediate proxy server $SP_n$ that the access request message reached and the port for the application processing executed by the proxy server $SP_n$.

In the non-limiting embodiment shown in FIG. 3, the first interception channel 1 comprises at least, connected in cascade, an HTTP proxy module $1_0$ receiving the access request message. This HTTP proxy module $1_0$ has resources for analyzing each received data packet of the access request message at the level of the application process, i.e. at the level of the last application process executed by the last proxy server $SP_n$, for example.

The HTTP proxy module $1_0$ analyses the TCP IP connection parameters of the masking module MM at the last proxy server $SP_n$ concerned, for example.

The interception channel 1 further comprises a module $1_1$ for extracting and copying the IP address IP_CL of the client workstation from the specific X-Forwarded-For data field of the header of the access request message. The module $1_1$ also deletes the specific data field in accordance with steps $E_1$ and $E_2$ represented in FIG. 2b, for example. It also stores the intermediate source IP address IP_$SP_n$ corresponding to that of the last proxy server that the access request message reached, as described for step D in FIG. 2a, for example.

The first interception channel 1 also comprises an IP data packet generator module $1_2$. The IP packet generator module $1_2$ replaces the intermediate source IP address, i.e. that of the last proxy server that the access request message reached, namely the proxy server $SP_n$, with the IP address contained in the specific data field of the header of the access request message, i.e. the IP address IP_CL of the client workstation.

Finally, the first interception channel 1 finally comprises a module $1_3$ for sending IP data packets.

The second interception channel 2 comprises a transparent HTTP proxy module $2_0$ receiving the specific response message generated by the server S and a module $2_1$ for recovering the IP address of the last intermediate proxy server $SP_n$ that the access request message reached and the port for the application processing executed by the last intermediate proxy server.

The above module $2_1$ is followed by an IP data packet generator module $2_2$ executing step K represented in FIG. 2c and establishing the corresponding reconstructed response message.

The module $2_2$ is followed by a module $2_3$ for sending the IP packets to the destination IP address IP_$SP_n$ of the last proxy server $SP_n$ that the access request message reached.

The IP packet generator module $2_2$ replaces the destination IP address, i.e. the address IP_CL of the client workstation, with that of the proxy server $SP_n$.

The operation of the masking module MM shown in FIG. 3 is described below.

On interception of an access request message by the first interception channel 1, the write/read storage module 3 serves as a correspondence database storing the IP address of the service, i.e. of the application process provided by the last proxy server $SP_n$ associated with the IP address IP_CL of the current workstation (step D in FIG. 2a).

The correspondence database ensures that an application process or service provided by the last proxy server processing the data packets constituting the access request message receives the corresponding response from the server.

The correspondence database also ensures correlation between the TCP connection set up between the last proxy server $SP_n$ and the masking module MM and the TCP connection set up between the masking module MM and the server S.

The following reference symbols are used in FIG. 3:
$CTCP_S$: parameters for the TCP connection of the masking module MM to the server S, and
$CTCP_n$: parameters for the TCP connection of the masking module MM to the last proxy server $SP_n$.

It is clear, in particular, that these parameters are stored in the correspondence database 3 through the intermediary of the HTTP proxy module $1_0$, respectively the IP packet sender $1_3$.

Of course, the interconnection of the masking module MM and the server S, respectively the proxy server $SP_n$, is effected through the intermediary of a service interface $IF_0$, respectively a server interface $IF_1$.

The operation of the masking module MM of the present invention, i.e. the management of all of the modules constituting the first interception channel 1, the second interception channel 2, and the write/read storage module 3 serving as the knowledge base, is sequenced through the intermediary of a microprocessor and a working memory that are not shown in the drawings.

Finally, the masking module MM may equally well be implemented in the form of a computer for implementing a communications layer for communication with a proxy server and with servers using the HTTP process and a mechanism for receiving requests from proxy servers, replacing the IP addresses of the proxy servers contained in the requests with those of the client workstations, sending the modified requests to the servers concerned, receiving the responses from the servers, substituting the IP addresses of the proxy servers concerned for the IP addresses of the destination workstations, and sending the modified responses to the proxy servers concerned.

The masking method of the present invention and the corresponding masking module may be implemented under any of the application protocols with provision for their mode of execution and for inserting the IP address of the client workstation at the application level.

If the application protocol is an HTTP type protocol, the HTTP proxy servers insert into the headers of access request messages that they receive the IP address of the client workstation originating the access request message.

If it is not possible to define means for inserting the address of the client workstation into the stream of data transmitted, superficial modification of the first proxy server $SP_1$ may be envisaged to enable it to insert the IP address of the client workstation into a proprietary data field transmitted in the stream.

The invention claimed is:

1. A method of masking application processing of a request for access to a server sent by a client workstation connected to the server through the intermediary of successive intermediate proxy servers of an IP network, said method including:
    at the first proxy server that the access request message reaches:
    a) executing the application processing applied to said access request message by said first intermediate proxy server;
    b) inserting the IP address of the client workstation into a specific data field of the header of said access request message;
    at said successive proxy servers:
    c) without invoking an IP spoofing function, successively transmitting the access request message to the next proxy server and retaining the IP address of the client workstation in the header of said access request message, for executing the application processing applied by each of said successive intermediate proxy servers and, after execution of each of the successive application processes and forwarding of said access request message by the last of said successive intermediate proxy servers to said server:
    at a masking module having an interception connection to said server:
    d) intercepting said access request message;

e) eliminating said specific field from the header of said access request message to mask the application processes applied by said successive intermediate proxy servers;

f) constructing a masked access request message comprising a source IP address corresponding to the address of the client workstation and a destination IP address corresponding to the IP address of said server; and g) transmitting said masked access request message from said masking module to said server, thereby enabling said server to process said masked access request message as if it came directly from the client workstation.

2. The method according to claim 1, wherein said step of eliminating said specific field from the header of said access request message includes:

$e_1$) storing the IP address of the client workstation taken from said specific field of the header of said access request message; and $e_2$) deleting the IP address data of the client workstation in said specific field of the header of said access request message.

3. The method according to claim 1, further comprising, after the interception step, a step of storing the intermediate source IP address of said last intermediate proxy server.

4. The method according to claim 1, said method further comprising:

upon a specific response message being sent to the destination address, at a masking module:

h) intercepting said specific response message;

i) extracting from said specific response message said destination address, i.e. the IP address of said client workstation;

j) on the basis of said destination address, discriminating the intermediate source IP address corresponding to the IP address of the last intermediate proxy server that said access request message has reached;

k) on the basis of said specific response message, constructing a reconstructed response message comprising a destination address corresponding to said intermediate source IP address corresponding to the IP address of the last intermediate proxy server that said access request message has reached;

l) sending said reconstructed response message from the masking module to said last intermediate proxy server, and at said last intermediate proxy server and the successive intermediate proxy servers:

m) executing the corresponding application processing, successively sending the reconstructed response message to the preceding proxy server and, after successive execution of each of the application processes by each of said intermediate proxy servers, at said first intermediate proxy server that said access request message reaches, n) constructing a transparent response message by replacing the intermediate source IP address in said reconstructed response message corresponding to that of said first proxy server that said access request message reaches with the source IP address corresponding to that of the server; and o) sending said transparent response message from said first proxy server to said client workstation, thereby enabling said client workstation to process said transparent response message as if it came directly from said server.

5. The method according to claim 4, wherein, for implementing step m) consisting of constructing a transparent response message, it consists in:

$n_1$) fetching the destination IP address of the access request message stored at the first proxy server that the access request message reaches at the time of sending the access request message, and $n_2$) writing the fetched destination IP address in place of the intermediate source IP address to constitute the source IP address corresponding to that of the server.

6. A module for masking application processes of an access request message sent by a client workstation connected to a server through the intermediary of successive intermediate proxy servers of an IP network and a response sent by said server to said client workstation, said module including:

a first interception channel for intercepting said access request message in order to generate from said access request message a masked access request message comprising a source IP address corresponding to the address of the client workstation and a destination IP address corresponding to the IP address of the server;

a second interception channel for intercepting a specific response message sent by said server in response to the masked access request message so that a reconstructed response message can be constructed on the basis of said specific response message;

a storage module accessible in write/read mode by the first, respectively the second, interception channel and enabling:

on interception of an access request message, storage of the IP address of the client workstation taken from a specific field of the header of said access request message and the IP address of the last intermediate proxy server that said access request message has reached, and on interception of a specific response message, extraction of the IP address of the last intermediate proxy server that the access request message has reached and the port for the application processing applied by said proxy server.

7. The masking module according to claim 6, wherein said first interception channel comprises at least, connected in cascade:

a proxy module for receiving said access request message;

a module for copying the IP address of said client workstation from the specific data field of the header of the access request message and deleting said specific data field;

a module for generating IP data packets for constructing the masked access request message comprising a source IP address corresponding to the IP address of the client workstation and a destination address corresponding to the IP address of said server; and a module for sending IP data packets.

8. The masking module according to claim 6, wherein said second interception channel comprises at least, connected in cascade:

a transparent proxy module receiving said specific response message;

a module for recovering the IP address of the last intermediate proxy server that the access request message has reached and the port for the application processing applied by the last intermediate proxy server that the access request message has reached;

a module for generating IP data packets; and a module for sending IP data packets.

* * * * *

UNITED STATES PATENT AND TRADEMARK OFFICE
CERTIFICATE OF CORRECTION

PATENT NO. : 7,581,014 B2  Page 1 of 1
APPLICATION NO. : 10/913333
DATED : August 25, 2009
INVENTOR(S) : Mittig et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1354 days.

Signed and Sealed this

Fourteenth Day of September, 2010

David J. Kappos
*Director of the United States Patent and Trademark Office*